United States Patent
Qu et al.

(10) Patent No.: US 9,793,797 B2
(45) Date of Patent: Oct. 17, 2017

(54) SWITCHING APPARATUS AND CONTROL METHOD THEREOF

(71) Applicant: SILICON WORKS CO., LTD., Daejeon-si (KR)

(72) Inventors: Wanyuan Qu, Daejeon-si (KR); Se Won Lee, Daejeon-si (KR); Ju Pyo Hong, Daejeon-si (KR); Ok Hwan Kwon, Daejeon-si (KR); Hai Feng Jin, Daejeon-si (KR); Sung Hwan Kim, Daejeon-si (KR); Ju Hyun Lee, Daejeon-si (KR); Jin Won Mok, Dongduceon-si (KR); Ju Yeong Kim, Taebaek-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 206 days.

(21) Appl. No.: 14/632,148

(22) Filed: Feb. 26, 2015

(65) Prior Publication Data

US 2015/0249388 A1 Sep. 3, 2015

(30) Foreign Application Priority Data

Feb. 28, 2014 (KR) ........................ 10-2014-0024125

(51) Int. Cl.
*H02M 3/156* (2006.01)
*H02M 1/00* (2006.01)
*H02M 3/155* (2006.01)

(52) U.S. Cl.
CPC .... *H02M 3/156* (2013.01); *H02M 2001/0009* (2013.01); *H02M 2003/1555* (2013.01)

(58) Field of Classification Search
CPC .... H02M 3/156; H02M 3/158; H02M 3/1588; H02M 3/1563; H02M 3/157; H02M 3/155; H02M 3/1582; H02M 2001/0009; H02M 2003/1557; H02M 2003/1566; G05F 1/565; G05F 1/575; G05F 1/567; G05F 1/56
See application file for complete search history.

(56) References Cited

U.S. PATENT DOCUMENTS

| | | | |
|---|---|---|---|
| 7,719,248 B1 | 5/2010 | Melanson | |
| 7,863,836 B2 | 1/2011 | Mednik et al. | |
| 8,400,798 B2 | 3/2013 | Bagarelli et al. | |
| 8,786,319 B1* | 7/2014 | Wang | G11C 27/02 327/217 |
| 2009/0302774 A1* | 12/2009 | Mednik | H05B 33/0815 315/209 R |
| 2014/0225531 A1 | 8/2014 | Cai et al. | |

* cited by examiner

*Primary Examiner* — Timothy J Dole
*Assistant Examiner* — Bryan R Perez
(74) *Attorney, Agent, or Firm* — Kile Park Reed & Houtteman PLLC

(57) ABSTRACT

Disclosed are a switching apparatus including an internal circuit using an inductive element and a control method thereof. The switching apparatus includes a switch that regulates a current of the inductive element, and a signal control circuit that arithmetically calculates a turn-off time point of the switch by using a monitoring voltage corresponding to the current of the inductive element, a sampling voltage of the monitoring voltage, and a reference voltage corresponding to a target average current of the inductive element, and controls the switch.

11 Claims, 19 Drawing Sheets

SWITCHING APPARATUS AND CONTROL METHOD THEREOF

CROSS-REFERENCE TO RELATED APPLICATIONS

The present application claims priority of Korean Patent Application No. 10-2014-0024125, filed on Feb. 28, 2014, which is incorporated herein by reference in its entirety.

BACKGROUND

1. Field

Exemplary embodiments of the present invention relate to a switching apparatus, and more particularly, to a switching apparatus capable of accurately controlling an average current flowing through an inductive element and a control method thereof.

2. Description of the Related Art

In conventional current programmed control, a peak current of a switching transistor is mainly used. Such a peak current control scheme has fast transient response and stability, but a switching ripple current flowing through an inductive element may reduce the accuracy of a current control loop. Therefore, since there is a limitation in the peak current control scheme, it is necessary to detect all currents flowing through the inductive element in order to accurately detect an average current.

SUMMARY

Various embodiments are directed to a switching apparatus for improving the degree of accuracy of current programmed control and a control method thereof.

Various embodiments are directed to a switching apparatus capable of accurately controlling an average current flowing through an inductive element and a control method thereof.

Problems to be solved of the present invention are not limited to the aforementioned problems, and other unmentioned problems will be readily understood by those skilled in the art from the following description.

In an embodiment, a switching apparatus including an internal circuit using an inductive element includes: a switch that regulates a current of the inductive element; and a signal control circuit that arithmetically calculates a turn-off time point of the switch by using a monitoring voltage corresponding to the current of the inductive element, a sampling voltage of the monitoring voltage, and a reference voltage corresponding to a target average current of the inductive element, and controls the switch.

In an embodiment, a switching apparatus including an internal circuit using an inductive element includes: a switch that regulates a current of the inductive element; an SR latch that turns on the switch in correspondence to a set signal periodically provided and turns off the switch in correspondence to a reset signal; and a reset signal generator that receives a monitoring voltage corresponding to the current of the inductive element and a reference voltage corresponding to a target average current of the inductive element, obtains a first voltage and a second voltage sampled using at least one of the monitoring voltage and the reference voltage, and generates the reset signal when levels of the first and second voltages are equal to each other.

In an embodiment, a control method of a switching apparatus including an internal circuit using an inductive element and a switch for controlling a current of the inductive element includes the steps of: turning on the switch in correspondence to a set signal periodically provided; receiving a monitoring voltage corresponding to the current flowing through the inductive element when the switch is turned on, and receiving a reference voltage corresponding to a target average current of the inductive element; arithmetically calculating a turn-off time point of the switch by using a sampling voltage sampled using at least one of the monitoring voltage and the reference voltage, the monitoring voltage, and the reference voltage; and turning off the switch at the turn-off time point.

DETAILED DESCRIPTION

Figure 1:
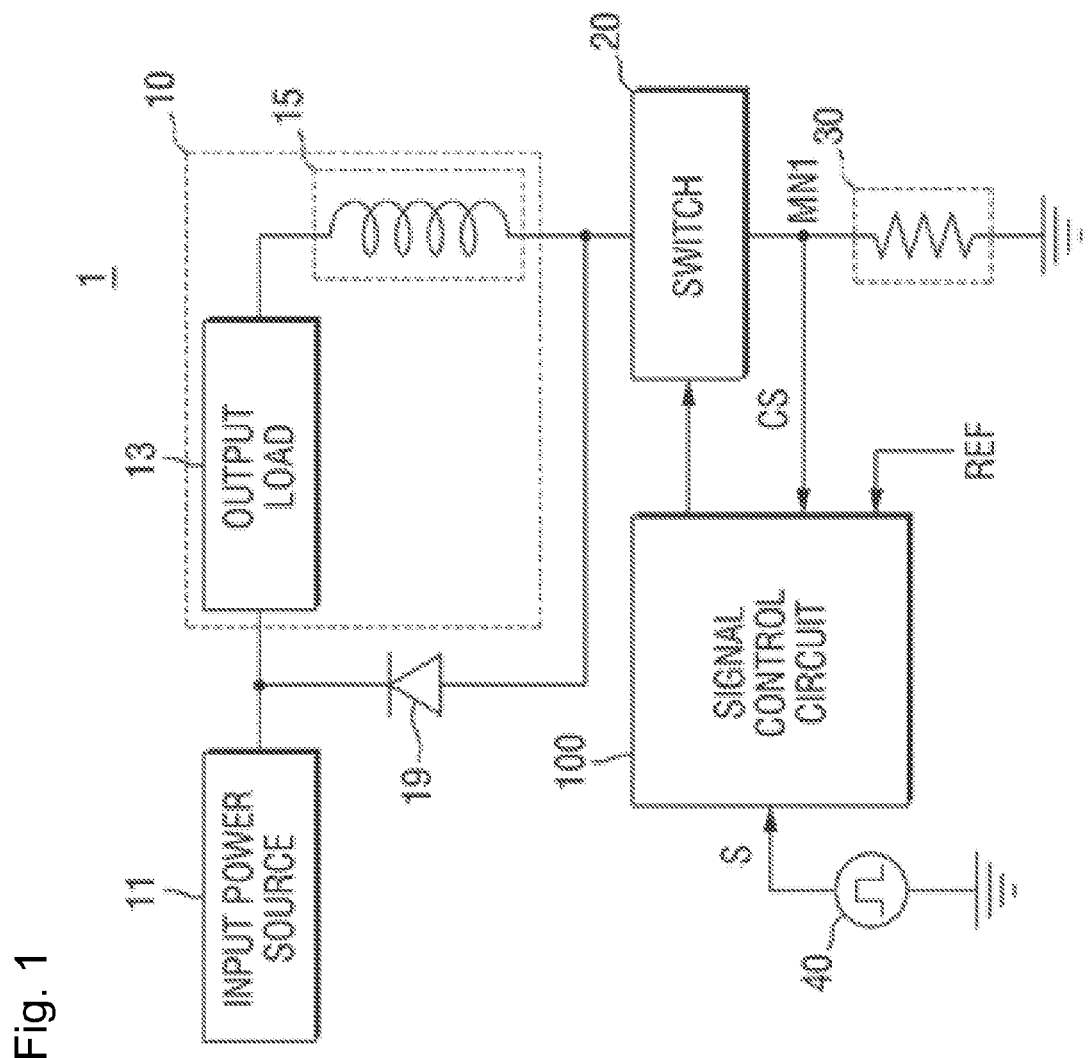
FIG. 1 is a block diagram for explaining an embodiment of a switching apparatus of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

The advantages and features of the present invention and methods for achieving them will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the scope of the present invention in the technical field to which the present invention pertains. The present invention is defined only by the scope of the appended claims. In addition, the same reference numerals are used to designate the same elements throughout the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. The same reference numerals are used to designate the same elements throughout the drawings. As used herein, the term "and/or" includes any and all combinations of one or more of the stated items.

Although terms like a first and a second are used to describe various elements, components, and/or sections, it is of course that these elements, components, and/or sections are not limited to these terms. These terms are used only to discriminate one element, component, or section from another element, component, or section. As used herein, it is of course that a first element, a first component, or a first section may also be a second element, a second component, or a second section within the technical scope of the present invention.

The terminology used herein is for the purpose of describing embodiments only and is not intended to limit the present invention. As used herein, the singular forms "a", "an" and "the" are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements.

Unless there is other definition, all terms (including technical and scientific terms) used herein may be used as meanings which may be commonly understood to those skilled in the art to which the present invention pertains. Further, terms defined in a generally used dictionary is not ideally or excessively construed unless they are clearly and particularly defined.

Figure 2:
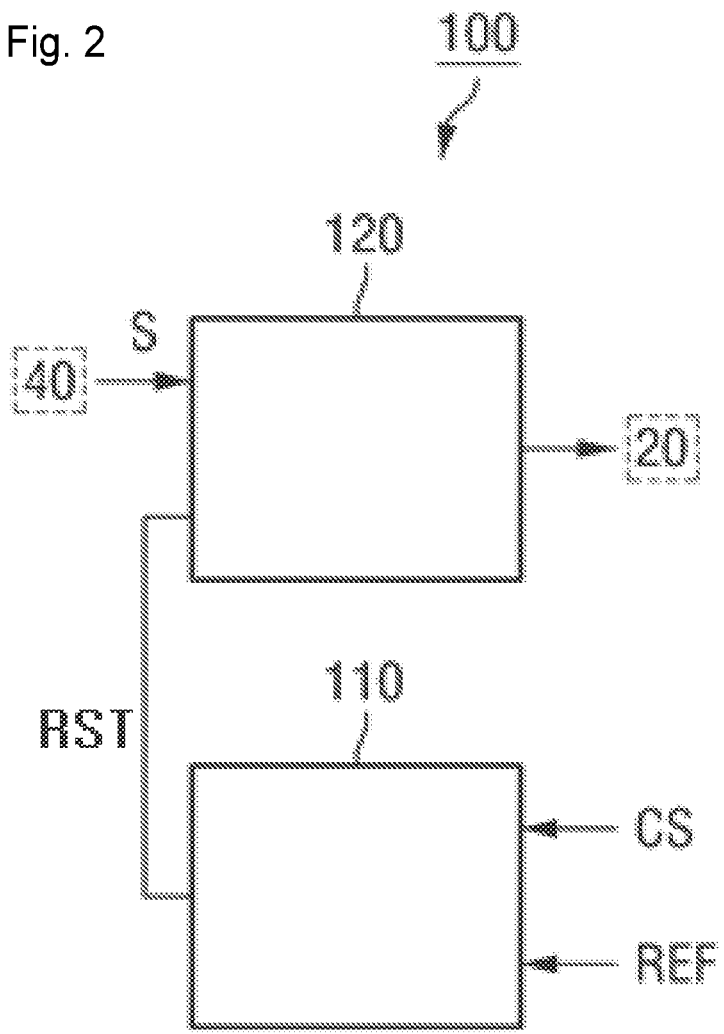
FIG. 2 is a block diagram for explaining an embodiment of a signal control circuit of FIG. 1.

FIG. 1 is a block diagram for explaining an embodiment of a switching apparatus of the present invention. FIG. 2 is a block diagram for explaining an embodiment of a signal control circuit of FIG. 1.

Referring to FIG. 1, a switching apparatus 1 of the present invention may include an internal circuit 10, an input power source 11, a switch 20, a signal control circuit 100, a catch diode 19, and a monitoring element 30. A node between the switch 20 and the monitoring element 30 may be defined as a monitoring node MN1.

The switching apparatus 1 may control a current flowing through an inductive element 15 in the internal circuit 10. Any circuit including the inductive element 15 may be used as the internal circuit 10, and for example, a buck converter, a light device, a power transformer and the like may be used. Such an internal circuit 10 may include an output load 13, wherein in more detail, the output load 13 may be provided between the input power source 11 and the inductive element 15. The output load 13, for example, may include a resistor or an LED. One terminal of the inductive element 15 may be connected to the output load 13 and the other terminal of the inductive element 15 may be connected to the switch 20, but the present invention is not limited thereto.

One terminal of the catch diode 19 may be connected to the switch 20 and the other terminal of the catch diode 19 may be connected between the input power source 11 and the output load 13. The catch diode 19 is also called a flyback diode, a freewheeling diode, a snubber diode, a suppressor diode, a clamp diode and the like. That is, the catch diode 19 generates a continuous loop such that the current flowing through the inductive element 15 can be exhausted when the switch 20 is turned off. That is, after the switch 20 is turned off, the current accumulated in the inductive element 15 is exhausted by passing through the catch diode 19, the output load 13, and the inductive element 15.

The monitoring element 30 may include a resistor arranged between a ground voltage and the switch 20, but the present invention is not limited thereto.

The signal control circuit 100 receives a set signal S from an oscillator 40, receives a monitoring voltage CS of the monitoring node MN1 and an external reference voltage REF, and turns on/off the switch 20, and the set signal S may include a periodic pulse.

The signal control circuit 100 turns on the switch 20 in correspondence to the set signal S. When the switch 20 is turned on, the signal control circuit 100 receives the monitoring voltage CS corresponding to the current flowing through the inductive element 15, and receives the preset reference voltage REF in correspondence to a target average current of the inductive element 15. The signal control circuit 100 samples at least one of the monitoring voltage CS and the reference voltage REF, arithmetically calculates a turn-off time point of the switch 20 by using at least one of a sampling voltage CSS, the monitoring voltage CS and the reference voltage REF, and controls an operation of the switch 20.

As described above, the signal control circuit 100 arithmetically calculates the turn-off time point of the switch 20 by using at least one of the sampling voltage CSS, the monitoring voltage CS, and the reference voltage REF such that an average current flowing through the inductive element 15 can flow by the target average current for the turn-on time of the switch 20.

Referring to FIG. 2, the signal control circuit 100 may include a reset signal generator 110 and a latch. The latch may include an SR latch 120, wherein the SR latch 120 receives a periodic pulse type set signal S with a predetermined frequency from the oscillator 40, and receives a reset signal RST from the reset signal generator 110.

The SR latch 120 provides a driving pulse for controlling the operation of the switch 20. The SR latch 120 decides the turn-on time point of the switch 20 by using the set signal S of the oscillator 40, and decides the turn-off time point of the switch 20 by using the reset signal RST of the reset signal generator 110.

The reset signal generator 110 generates first and second voltages based on at least one of the monitoring voltage CS, the reference voltage REF, and the sampling voltage CSS, and generates the reset signal RST when the first and second voltages become equal to each other. The first and second voltages may be arithmetically calculated using at least one of the reference voltage REF, the monitoring voltage CS, and the sampling voltage CSS according to embodiments of the reset signal generator 110.

The monitoring voltage CS is a voltage corresponding to the current flowing through the inductive element 15 when the switch 20 is turned on, and indicates a voltage of the monitoring node MN1. When the switch 20 is turned on, the monitoring voltage CS may gradually change (for example, increase) according to the passage of time, but the present invention is not limited thereto.

The reference voltage REF is a voltage corresponding to the target average current of the inductive element 15, and has a value set in advance. Such a reference voltage REF may be larger than a level (hereinafter, referred to as a "start level") of the monitoring voltage CS when the switch 20 is turned on, and may be smaller than a level (hereinafter, referred to as a "peak level") of the monitoring voltage CS when the switch 20 is turned off. For example, the reference voltage REF may have an average value of the start level and the peak level of the monitoring voltage CS. The sampling voltage CSS is a voltage obtained by sampling the monitoring voltage CS at the turn-on time point of the switch 20 (see FIG. 3 to FIG. 12). Alternatively, the sampling voltage CSS may be a voltage sampled using at least one of the monitoring voltage CS and the reference voltage REF (see FIG. 13 and FIG. 14). In detail, when the switch 20 is turned on, a current provided from the input power source 11 flows to the ground voltage via the output load 13, the inductive element 15, and the monitoring element 30. The switch 20 may be periodically turned on/off at a predetermined frequency, thereby controlling the current flowing through the inductive element 15 to change about the reference voltage REF. In this way, the switch 20 adjusts an average current flowing through the output load 13 and the inductive element 15.

Figure 3:
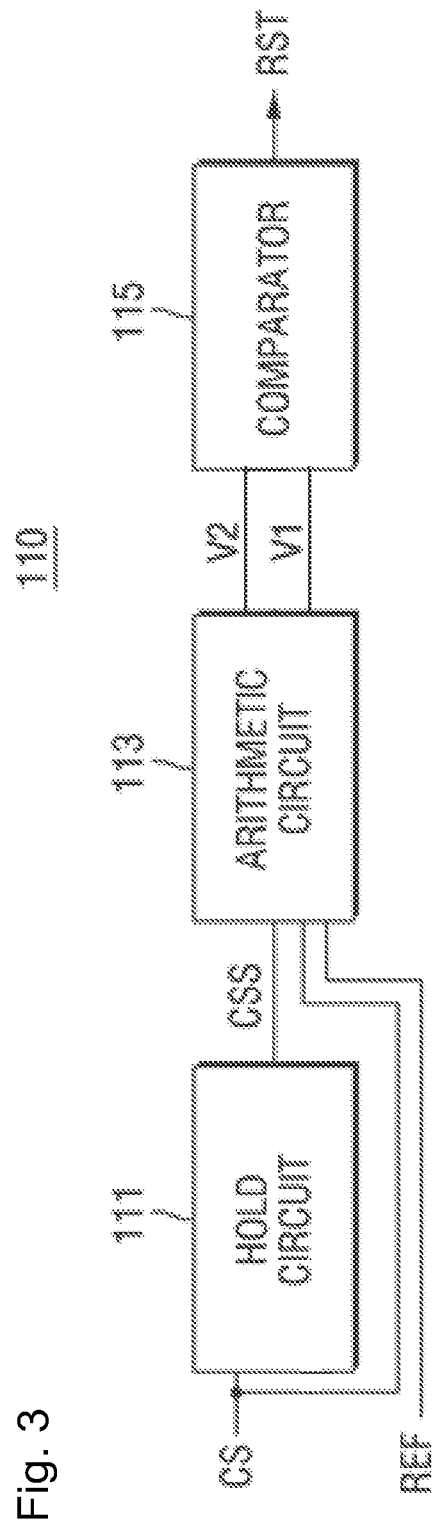
FIG. 3 is a block diagram for explaining an embodiment of a reset signal generator of FIG. 2.

FIG. 3 is a block diagram for explaining an embodiment of the reset signal generator of FIG. 2. Referring to FIG. 3, the reset signal generator 110 may include a hold circuit 111, an arithmetic circuit 113, and a comparator 115. The hold circuit 111 may be a sample and hold circuit or a track and hold circuit.

For example, the hold circuit 111 may receive the monitoring voltage CS, and sample the monitoring voltage CS when the switch is turned on (see CSS of FIG. 3 and FIG. 4 to FIG. 13). According to embodiments, the hold circuit 111 may also sample the monitoring voltage CS and the reference voltage REF (see FIG. 14).

The arithmetic circuit 113 generates a first voltage V1 and a second voltage V2 by using the monitoring voltage CS, the sampling voltage CSS, and the reference voltage REF. For example, the arithmetic circuit 113 may generate the first voltage V1 by using a selected part of the monitoring voltage CS, the sampling voltage CSS, and the reference voltage REF, and generate the second voltage V2 by using a remaining part of the monitoring voltage CS, the sampling voltage CSS, and the reference voltage REF. The first voltage V1 and the second voltage V2 may be arithmetically calculated to have values with correlation for determining the time point at which the current flowing through the inductive element have reached the average current, and in more detail, at least one of the first voltage V1 and the second voltage V2 may have a resultant value through the arithmetic calculation such that the coincidence time point of the first voltage V1 and the second voltage V2 may be determined as the time point at which the average current flowing through the inductive element have reached the target average current.

That is, the comparator 115 generates the reset signal RST when the first voltage V1 and the second voltage V2 generated such a scheme become equal to each other.

As described above, various embodiments of the reset signal generator 110 for allowing the first voltage V1 and the second voltage V2 to have correlation may be exemplified.

Figure 4:
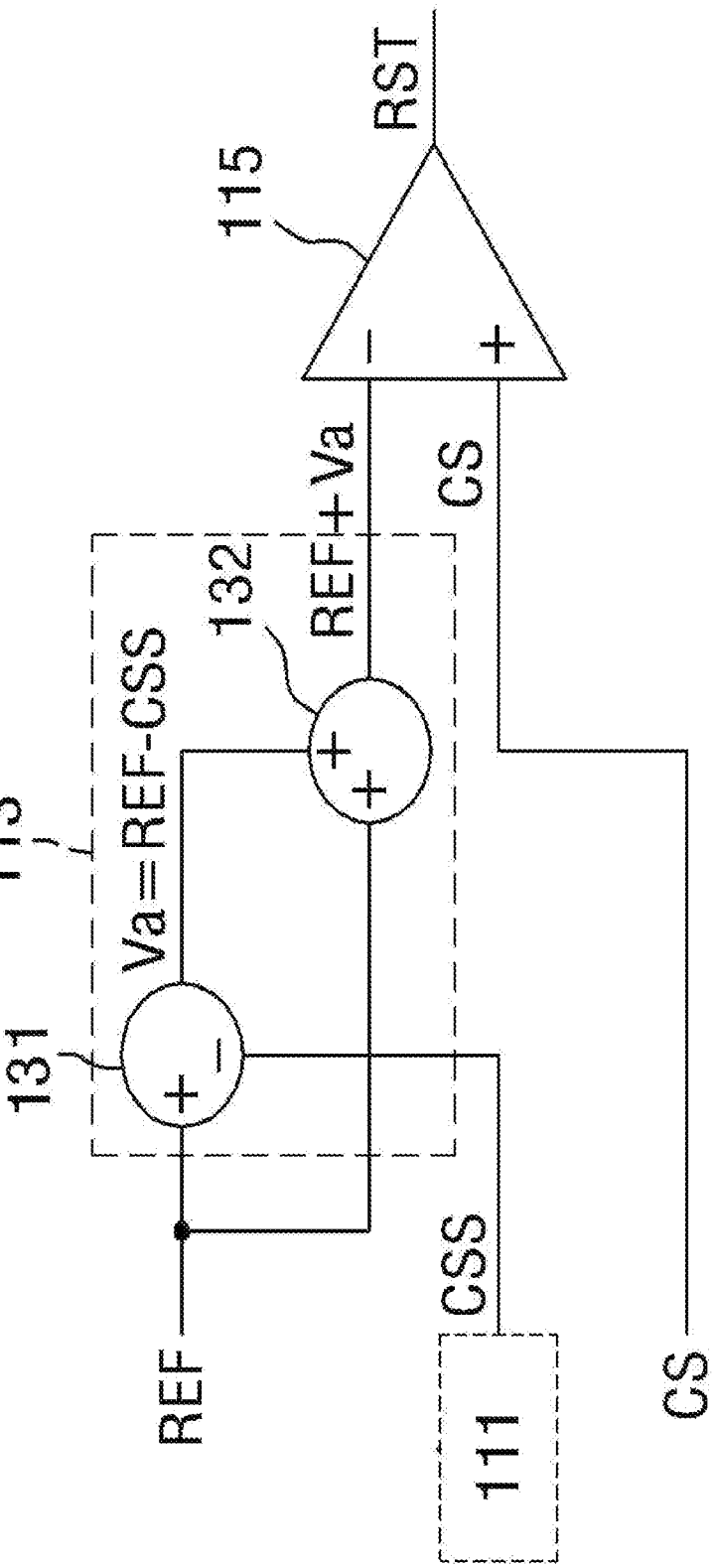
FIG. 4 is a circuit diagram for explaining an embodiment of a reset signal generator of FIG. 3.
Figure 5:
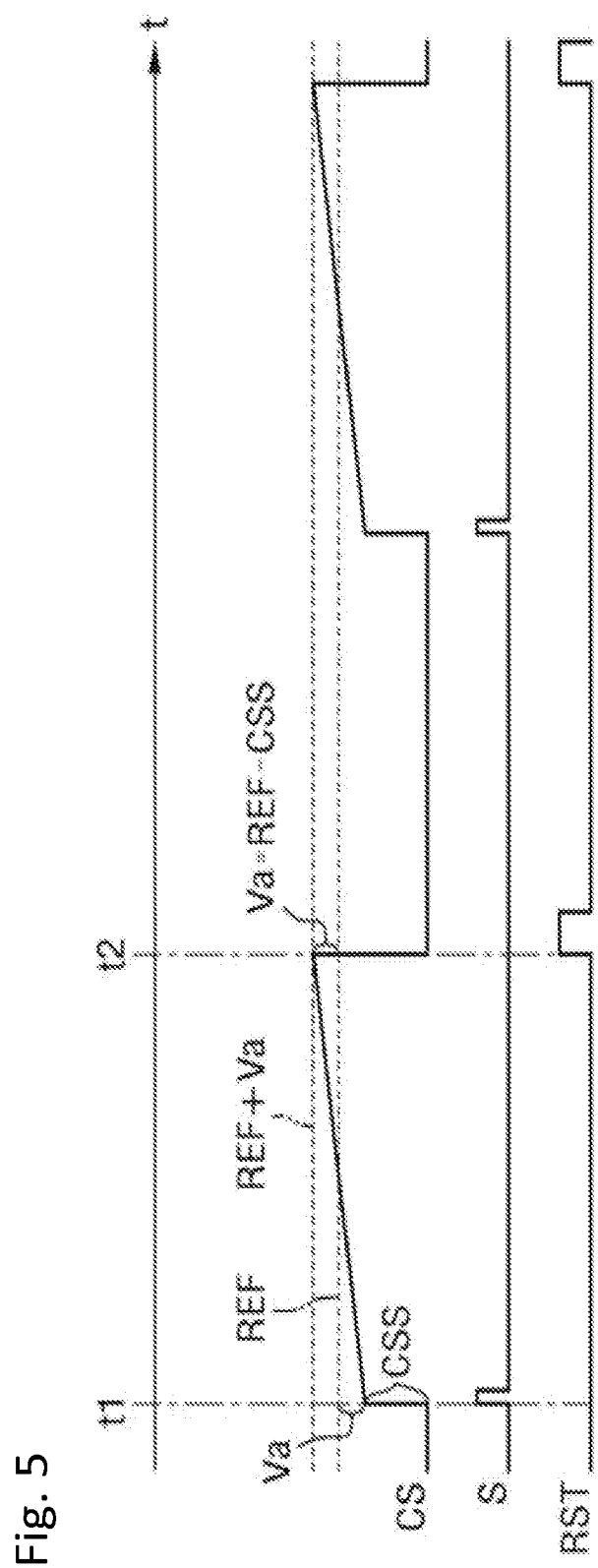
FIG. 5 is a timing diagram corresponding to a circuit diagram of FIG. 4.

FIG. 4 is a circuit diagram for explaining an embodiment of the reset signal generator 110 of FIG. 3. FIG. 5 is a timing diagram corresponding to the circuit diagram of FIG. 4.

Referring to FIG. 4 and FIG. 5, the reset signal generator 110 uses the monitoring voltage CS as the first voltage V1 and uses a voltage obtained by arithmetically calculating the sampling voltage CSS and the reference voltage REF as the second voltage V2.

The reset signal generator 110 of FIG. 4 includes a hold circuit 111 that outputs the sampling voltage CSS obtained by sampling the monitoring voltage CS at the turn-on time point t1 of the switch 20, an arithmetic circuit 113 that arithmetically calculates a difference Va between the sampling voltage CSS and the reference voltage REF and arithmetically calculates a value REF+Va obtained by adding the reference voltage REF to the difference Va as the second voltage V2, and a comparator 115 that generates the reset signal RST when the levels of the first and second voltages V1 and V2 are equal to each other.

Referring to FIG. 4, the hold circuit 111 generates the sampling voltage CSS of the monitoring voltage CS at the turn-on time point of the switch 20.

The arithmetic circuit 113 includes first and second arithmetic units 131 and 132. The first arithmetic unit 131 generates the voltage Va by subtracting the sampling voltage CSS from the reference voltage REF (Va=REF−CSS). The second arithmetic unit 132 generates the second voltage V2 by adding the voltage Va to the reference voltage REF. That is, the second voltage V2 may be REF+Va. The first voltage V1 is the monitoring voltage CS.

The comparator 115 generates the reset signal RST when the first and second voltages V1 and V2 become equal to each other.

Referring to FIG. 1, FIG. 4, and FIG. 5, at the time t1, the pulse type set signal S is generated. Based on the set signal S, the switch 20 is turned on. When the switch 20 is turned on, the sampling voltage CSS is generated and REF+Va is generated. The second voltage V2 is REF+Va and the first voltage V1 is the monitoring voltage CS.

The monitoring voltage CS gradually increases from the start level to the peak level.

At the time t2, when the monitoring voltage CS becomes equal to REF+Va, the reset signal RST is generated. That is, when CS=REF+Va=REF+(REF−CSS)=2REF−CSS, the switch 20 is turned off.

Figure 6:
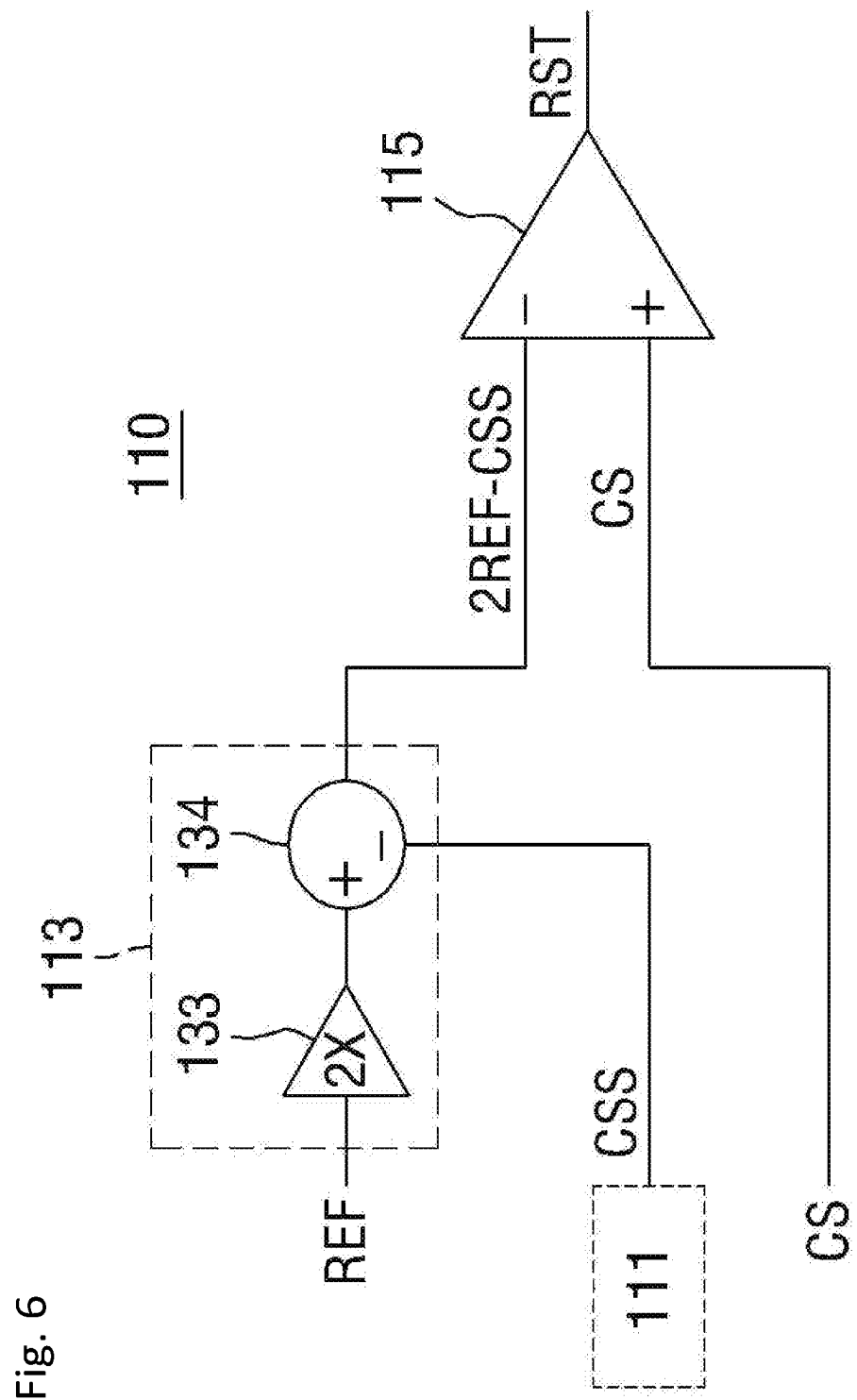
FIG. 6 is a circuit diagram for explaining another embodiment of a reset signal generator of FIG. 3.
Figure 7:
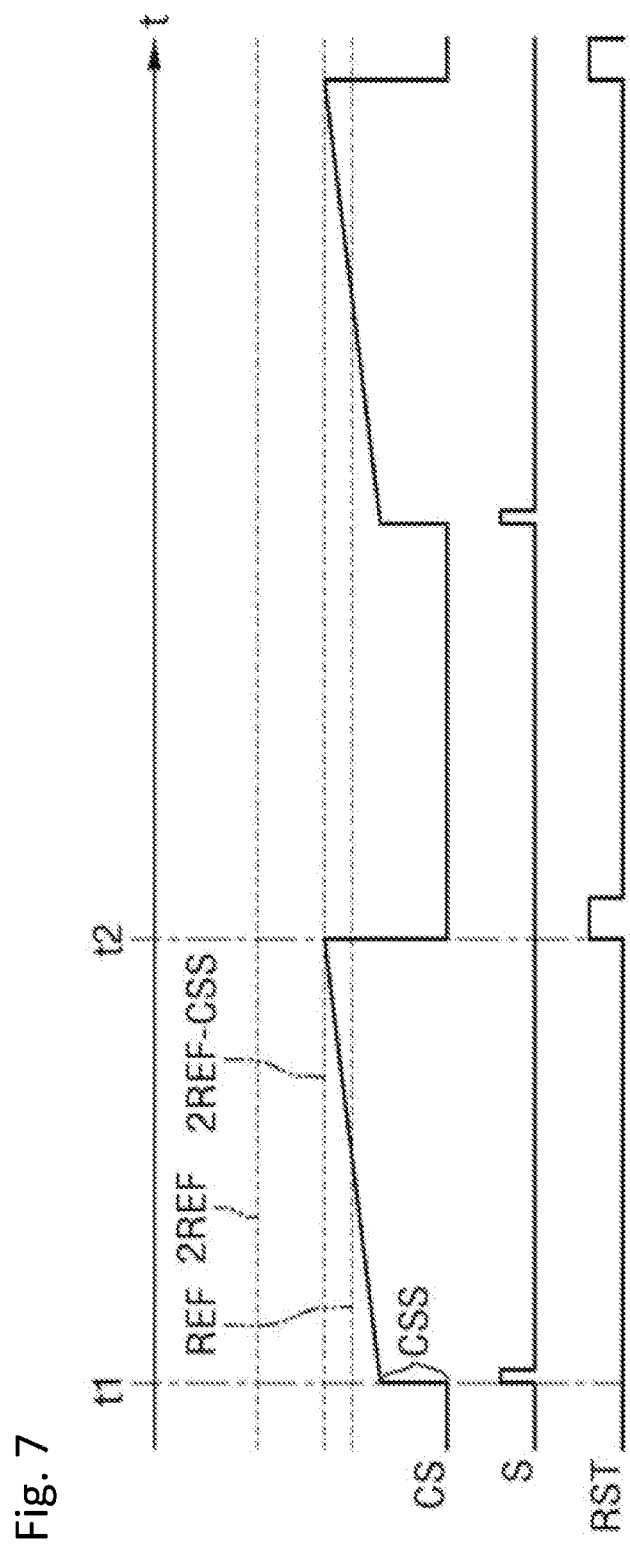
FIG. 7 is a timing diagram corresponding to a circuit diagram of FIG. 6.

FIG. 6 is a circuit diagram for explaining another embodiment of the reset signal generator of FIG. 3. FIG. 7 is a timing diagram corresponding to the circuit diagram of FIG. 6.

Referring to FIG. 6 and FIG. 7, the reset signal generator 110 uses the monitoring voltage CS as the first voltage V1 and uses a voltage obtained by arithmetically calculating the sampling voltage CSS and the reference voltage REF as the second voltage V2.

The reset signal generator 110 of FIG. 6 includes a hold circuit 111 that outputs the sampling voltage CSS obtained by sampling the monitoring voltage CS at the turn-on time point t1 of the switch 20, an arithmetic circuit 113 that arithmetically calculates a difference between a double reference voltage REF and the sampling voltage CSS as the second voltage V2, and a comparator 115 that generates the reset signal RST when the levels of the first and second voltages V1 and V2 are equal to each other.

Referring to FIG. 6, the hold circuit 111 generates the sampling voltage CSS of the monitoring voltage CS at the turn-on time point of the switch 20.

The arithmetic circuit 113 includes a multiplier 133 and a third arithmetic unit 134. The multiplier 133 generates the double reference voltage REF and the third arithmetic unit 134 generates 2REF−CSS by subtracting the sampling voltage CSS from the double reference voltage REF. The second voltage V2 is 2REF−CSS. The first voltage V1 is the monitoring voltage CS.

The comparator 115 generates the reset signal RST when the first and second voltages V1 and V2 become equal to each other.

Referring to FIG. 1, FIG. 6, and FIG. 7, at the time t1, the pulse type set signal S is generated. Based on the set signal S, the switch 20 is turned on. When the switch 20 is turned on, the sampling voltage CSS is generated and the arithmetic circuit 113 generates 2REF−CSS.

The monitoring voltage CS gradually increases from the start level to the peak level.

Figure 8:
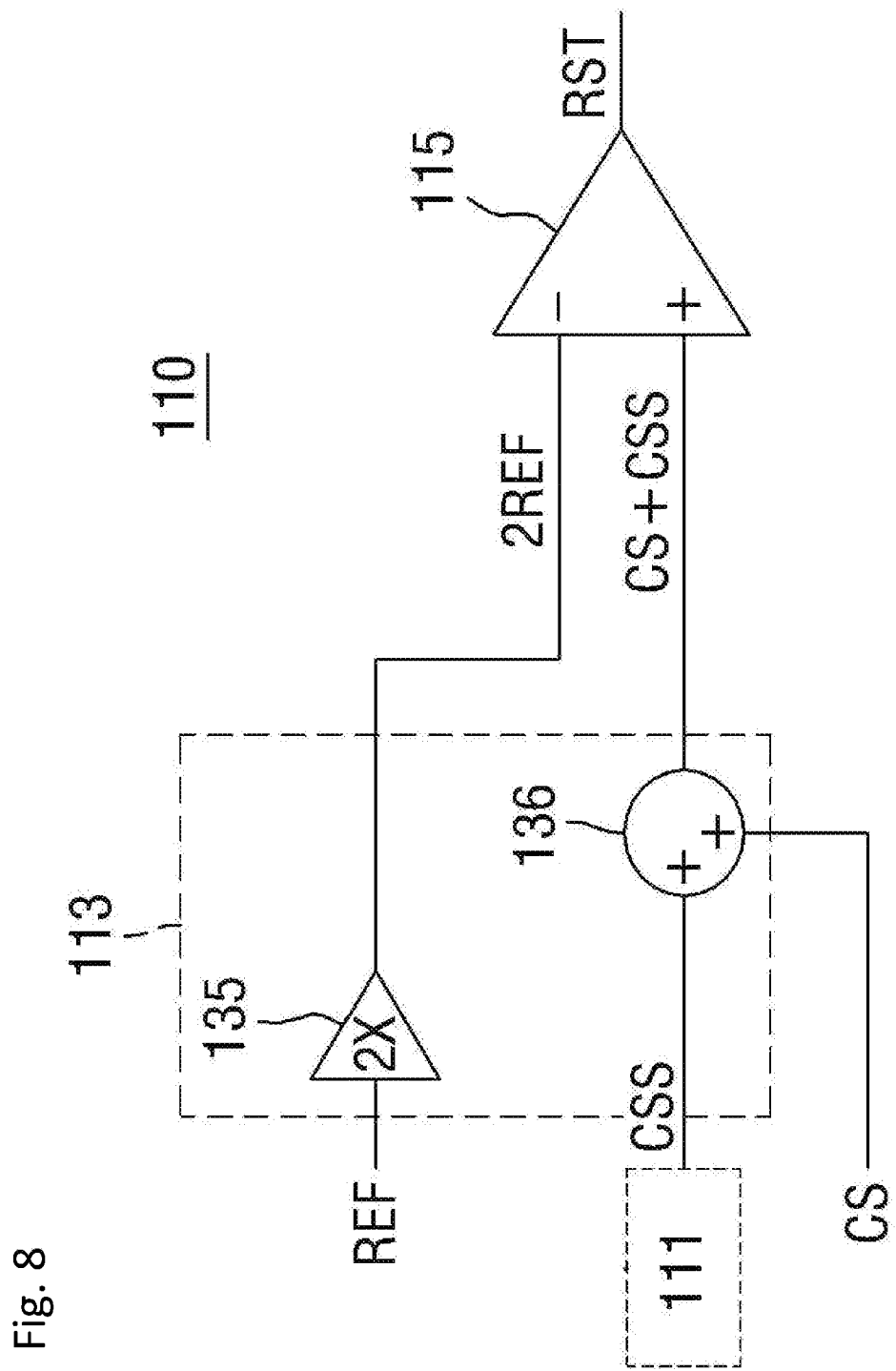
FIG. 8 is a circuit diagram for explaining further another embodiment of a reset signal generator of FIG. 3.
Figure 9:
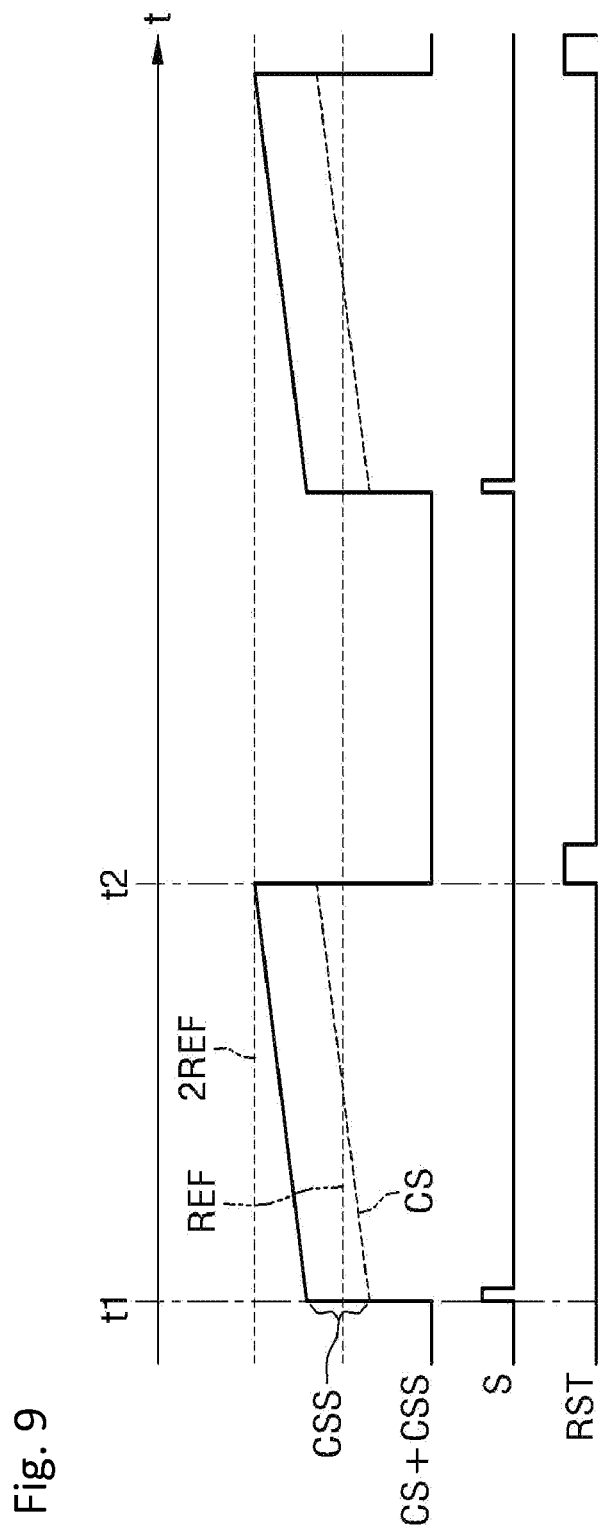
FIG. 9 is a timing diagram corresponding to a circuit diagram of FIG. 8.

At the time t2, when the monitoring voltage CS becomes equal to 2REF−CSS, the reset signal RST is generated. That is, when CS=2REF−CSS, the switch 20 is turned off. FIG. 8 is a circuit diagram for explaining further another embodiment of the reset signal generator of FIG. 3. FIG. 9 is a timing diagram corresponding to the circuit diagram of FIG. 8.

Referring to FIG. 8 and FIG. 9, the reset signal generator 110 uses a voltage obtained by arithmetically calculating the monitoring voltage CS and the sampling voltage CSS as the first voltage V1 and uses a voltage obtained by arithmetically calculating the reference voltage REF as the second voltage V2.

The reset signal generator 110 includes a hold circuit 111 that samples the monitoring voltage CS at the turn-on time point t1 of the switch 20 and outputs the sampling voltage CSS, an arithmetic circuit 113 that arithmetically calculates the sum of the sampling voltage CSS and the monitoring voltage CS as the first voltage V1 and arithmetically calculates a double reference voltage REF as the second voltage V2, and a comparator 115 that generates the reset signal RST when the levels of the first and second voltages V1 and V2 are equal to each other.

Referring to FIG. 8, the hold circuit 111 generates the sampling voltage CSS of the monitoring voltage CS at the turn-on time point of the switch 20.

The arithmetic circuit 113 includes a multiplier 135 and a fourth arithmetic unit 136. The multiplier 135 generates the double reference voltage REF. The second voltage V2 is 2REF.

The fourth arithmetic unit 136 generates the first voltage V1 by adding the monitoring voltage CS to the sampling voltage CSS. That is, the first voltage V1 is CS+CSS.

The comparator 115 generates the reset signal RST when the first and second voltages V1 and V2 become equal to each other.

Referring to FIG. 1, FIG. 8, and FIG. 9, at the time t1, the pulse type set signal S is generated. When the switch 20 is turned on based on the set signal S, the sampling voltage CSS is generated and the arithmetic circuit 113 generates CS+CSS.

The monitoring voltage CS gradually increases from the start level to the peak level. Accordingly, CS+CSS also gradually increases.

At the time t2, when CS+CSS becomes equal to 2REF, the reset signal RST is generated. That is, when CS+CSS=2REF and finally CS=2REF−CSS, the switch 20 is turned off.

Figure 10:
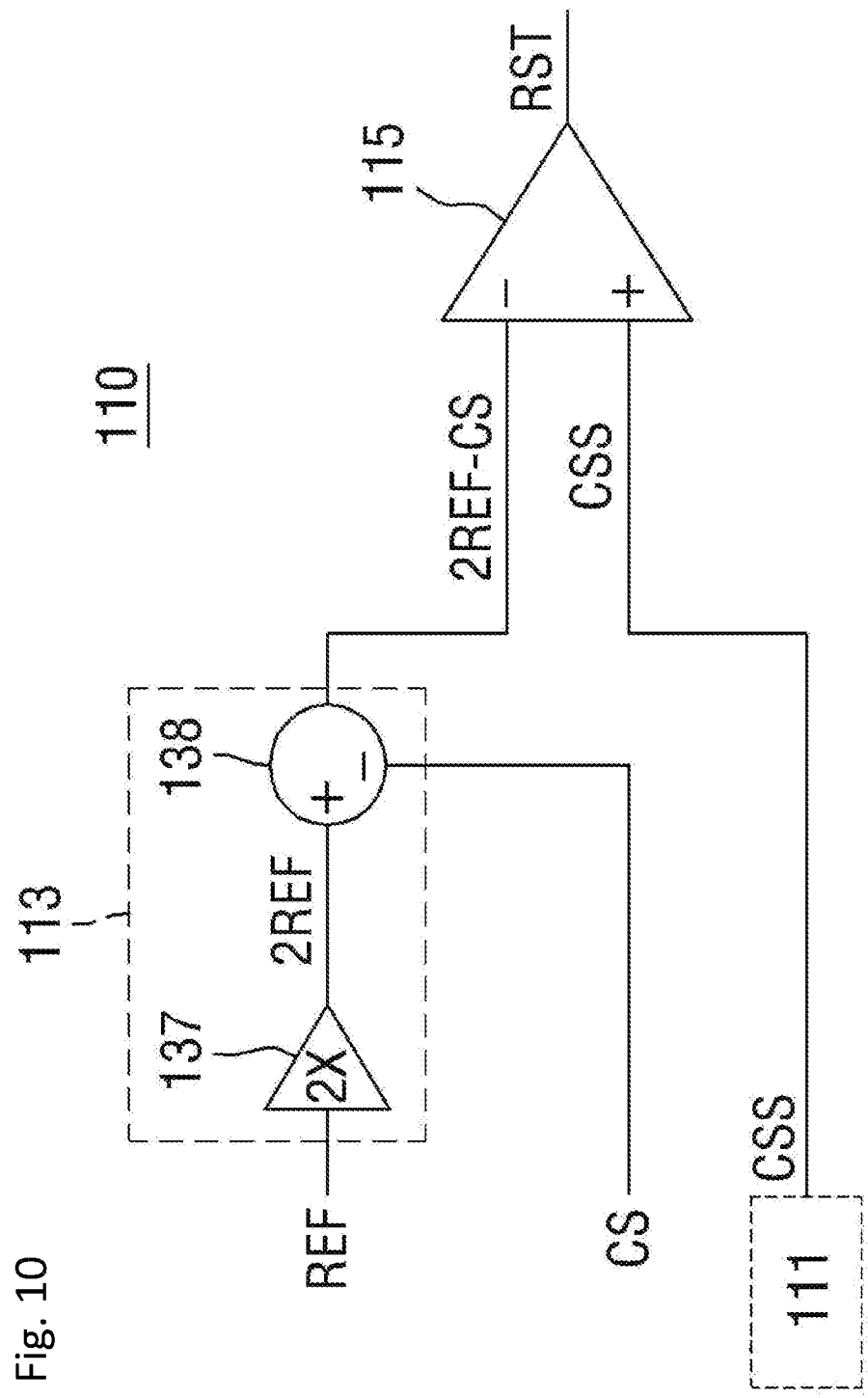
FIG. 10 is a circuit diagram for explaining further another embodiment of a reset signal generator of FIG. 3.
Figure 11:
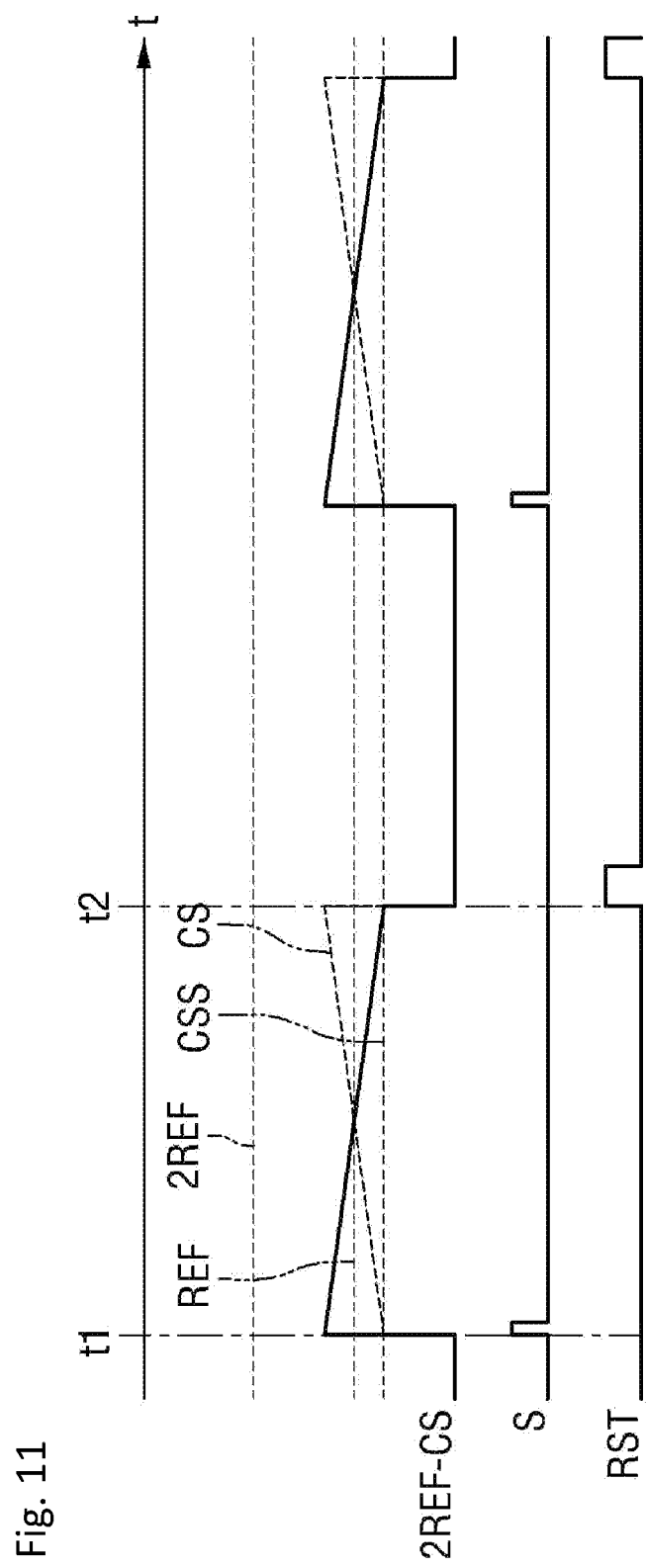
FIG. 11 is a timing diagram corresponding to a circuit diagram of FIG. 10.

FIG. 10 is a circuit diagram for explaining further another embodiment of the reset signal generator of FIG. 3. FIG. 11 is a timing diagram corresponding to the circuit diagram of FIG. 10.

Referring to FIG. 10 and FIG. 11, the reset signal generator 110 uses the sampling voltage CSS as the first voltage V1 and uses a voltage obtained by arithmetically calculating the monitoring voltage CS and the reference voltage REF as the second voltage V2.

The reset signal generator 110 includes a hold circuit 111 that outputs the sampling voltage CSS obtained by sampling the monitoring voltage CS at the turn-on time point t1 of the switch 20, an arithmetic circuit 113 that arithmetically calculates a difference 2REF−CS between a double reference voltage REF and the monitoring voltage CS as the second voltage V2, and a comparator 115 that generates the reset signal RST when the levels of the first and second voltages V1 and V2 are equal to each other. Referring to FIG. 10, the hold circuit 111 generates the sampling voltage CSS.

The arithmetic circuit 113 includes a multiplier 137 and a fifth arithmetic unit 138. The multiplier 137 generates the double reference voltage REF. The fifth arithmetic unit 138 generates 2REF−CS by subtracting the monitoring voltage CS from the double reference voltage REF. That is, the first voltage V1 is 2REF−CS. The second voltage V2 is the sampling voltage CSS.

The comparator 115 generates the reset signal RST when the first and second voltages V1 and V2 become equal to each other.

Referring to FIG. 1, FIG. 10, and FIG. 11, at the time t1, the pulse type set signal S is generated. When the switch 20 is turned on based on the set signal S, the sampling voltage CSS is generated and the arithmetic circuit 113 generates 2REF−CS.

The monitoring voltage CS gradually increases from the start level to the peak level. In contrast, 2REF−CS gradually decreases.

At the time t2, when 2REF−CS becomes equal to CSS, the reset signal RST is generated. That is, when 2REF−CS=CSS and finally CS=2REF−CSS, the switch 20 is turned off.

Figure 12:
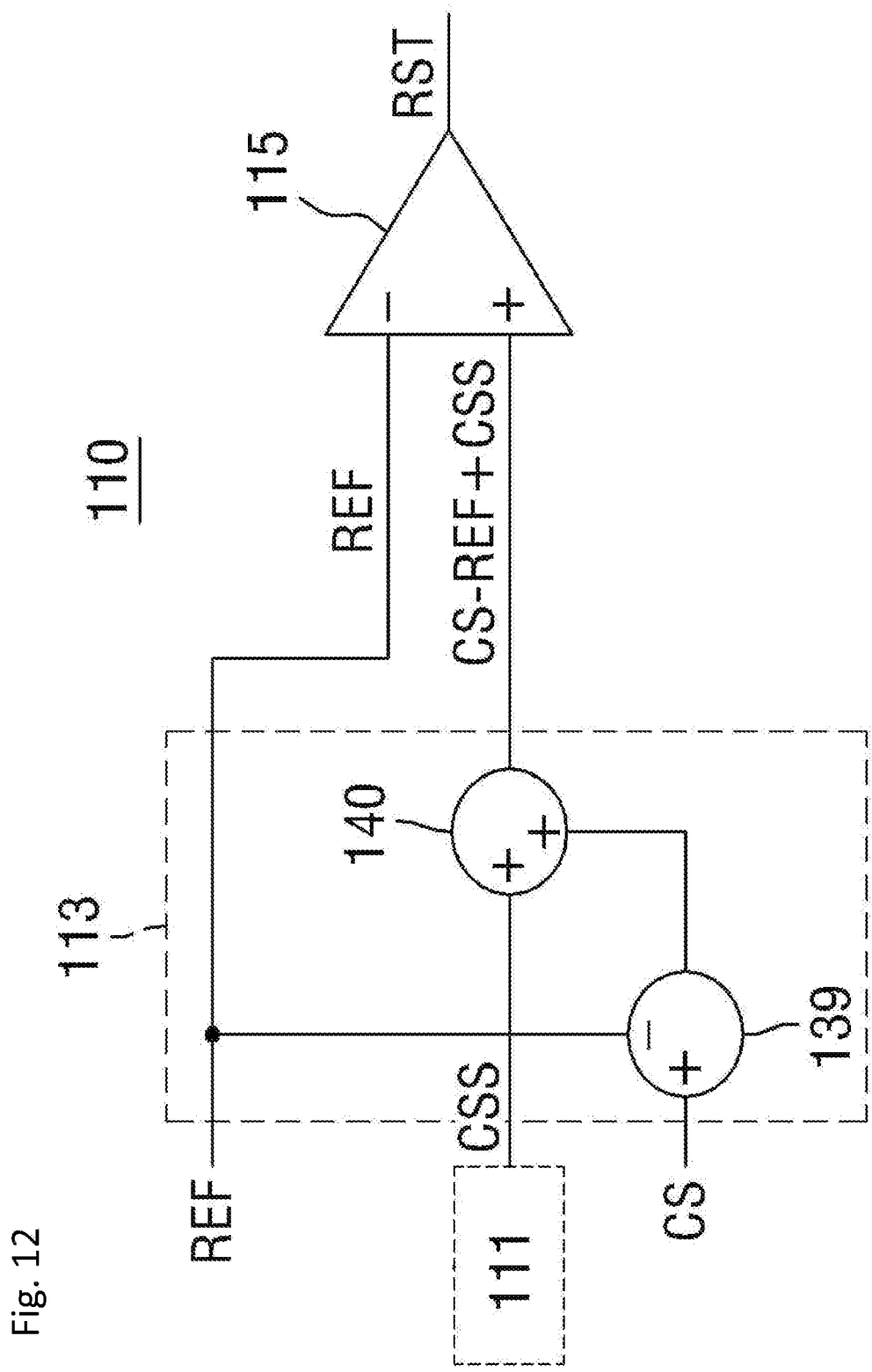
FIG. 12 is a circuit diagram for explaining further another embodiment of a reset signal generator of FIG. 3.
Figure 13:
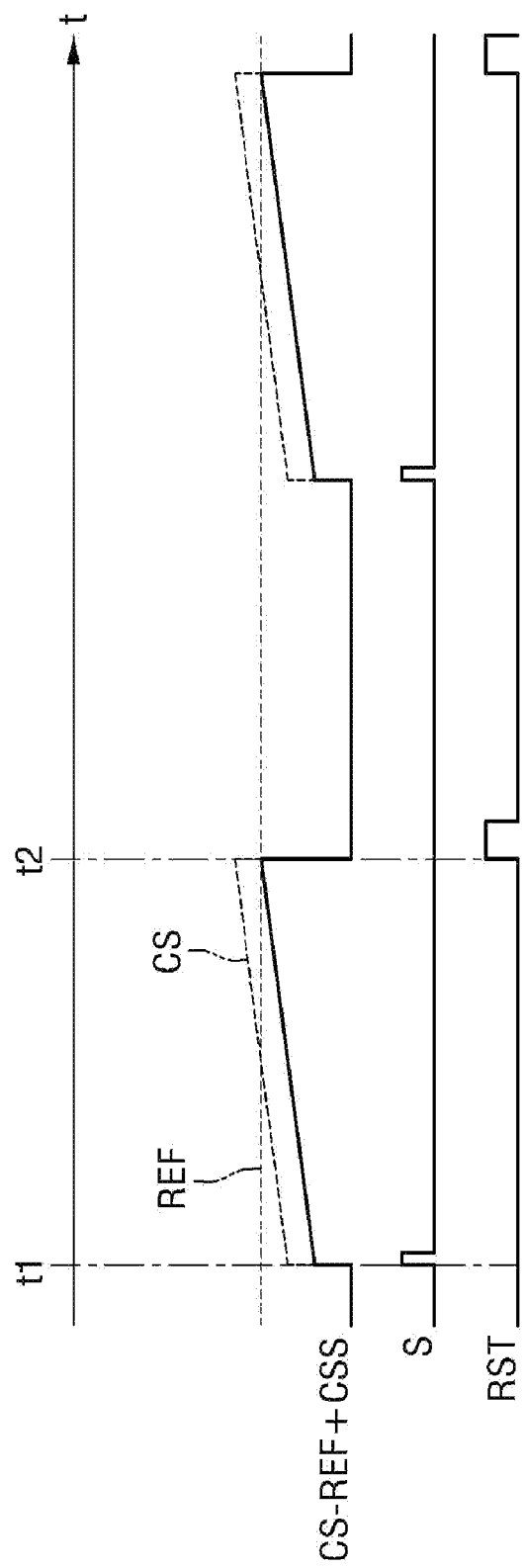
FIG. 13 is a timing diagram corresponding to a circuit diagram of FIG. 12.

FIG. 12 is a circuit diagram for explaining further another embodiment of the reset signal generator of FIG. 3. FIG. 13 is a timing diagram corresponding to the circuit diagram of FIG. 12.

Referring to FIG. 12 and FIG. 13, the reset signal generator 110 uses the reference voltage REF as the second voltage V2 and uses a voltage obtained by arithmetically calculating the monitoring voltage CS and the sampling voltage CSS as the first voltage V1.

The reset signal generator 110 includes a hold circuit 111 that outputs the sampling voltage CSS obtained by sampling the monitoring voltage CS at the turn-on time point t1 of the switch 20, an arithmetic circuit 113 that arithmetically calculates a value CS−REF+CSS obtained by adding the sampling voltage to a difference between the monitoring voltage CS and the reference voltage REF as the first voltage V1, and a comparator 115 that generates the reset signal RST when the levels of the first and second voltages V1 and V2 are equal to each other.

Referring to FIG. 12, the hold circuit 111 generates the sampling voltage CSS of the monitoring voltage CS at the turn-on time point of the switch 20.

The arithmetic circuit 113 includes a sixth arithmetic unit 139 and a seventh arithmetic unit 140. The sixth arithmetic unit 139 generates CS−REF by subtracting the reference voltage REF from the monitoring voltage CS. The seventh arithmetic unit 140 generates CS−REF+CSS by adding the sampling voltage CSS to CS−REF. The first voltage V1 is CS−REF+CSS and the second voltage V2 is the reference voltage REF.

The comparator 115 generates the reset signal RST when the first and second voltages V1 and V2 become equal to each other.

Referring to FIG. 1, FIG. 12, and FIG. 13, at the time t1, the pulse type set signal S is generated. When the switch 20 is turned on based on the set signal S, the sampling voltage CSS is generated. The arithmetic circuit 113 generates CS−REF+CSS.

The monitoring voltage CS gradually increases from the start level to the peak level. Accordingly, CS−REF+CSS also gradually increases.

At the time t2, when CS−REF+CSS becomes equal to REF, the reset signal RST is generated. That is, when CS−REF+CSS=REF and finally CS=2REF−CSS, the switch 20 is turned off.

Figure 14:
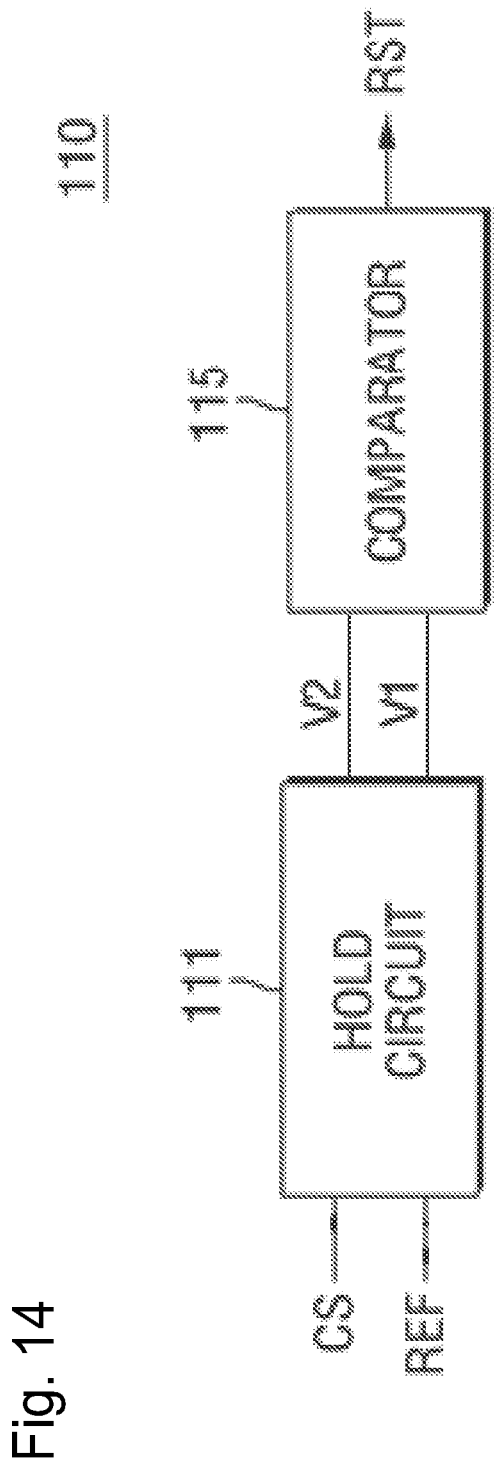
FIG. 14 is a block diagram for explaining another embodiment of a reset signal generator of FIG. 2.
Figure 15:
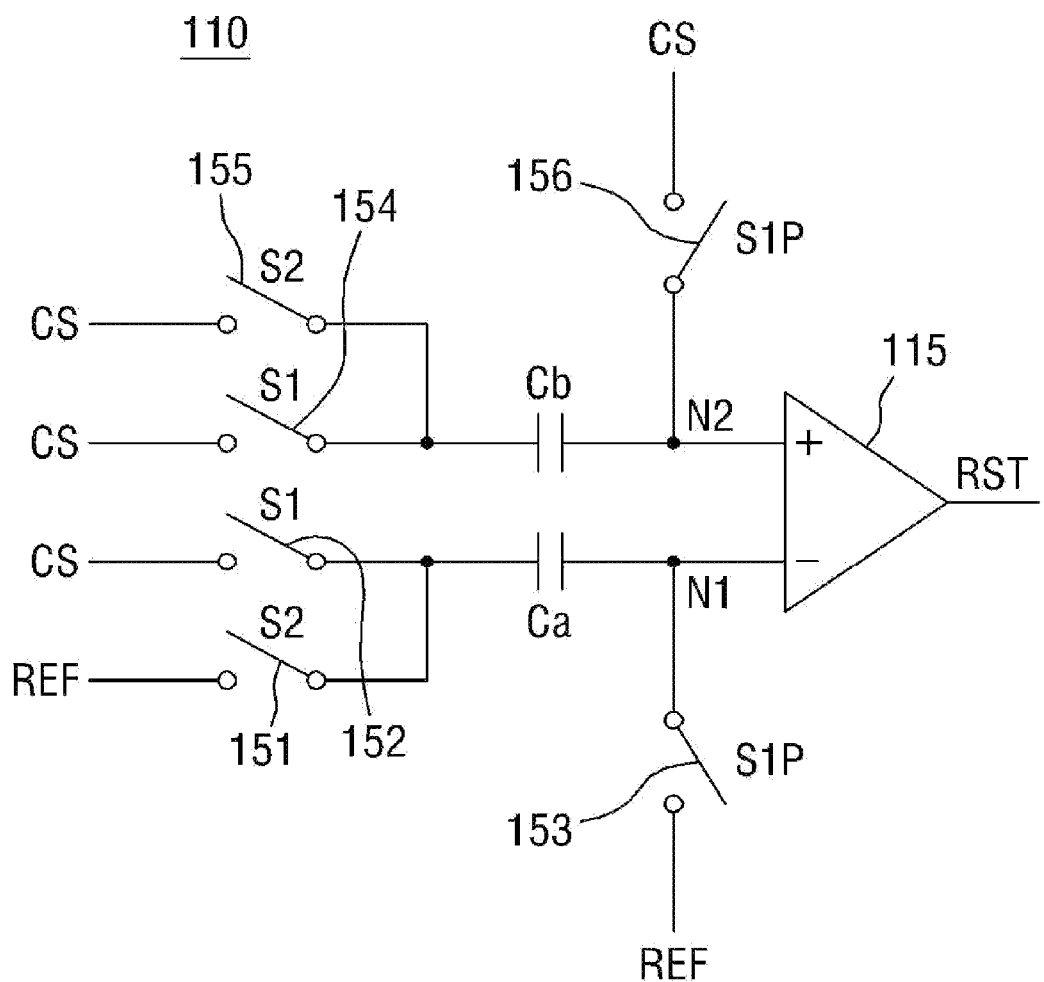
FIG. 15 is a circuit diagram for explaining an embodiment of a reset signal generator of FIG. 14.
Figure 16:
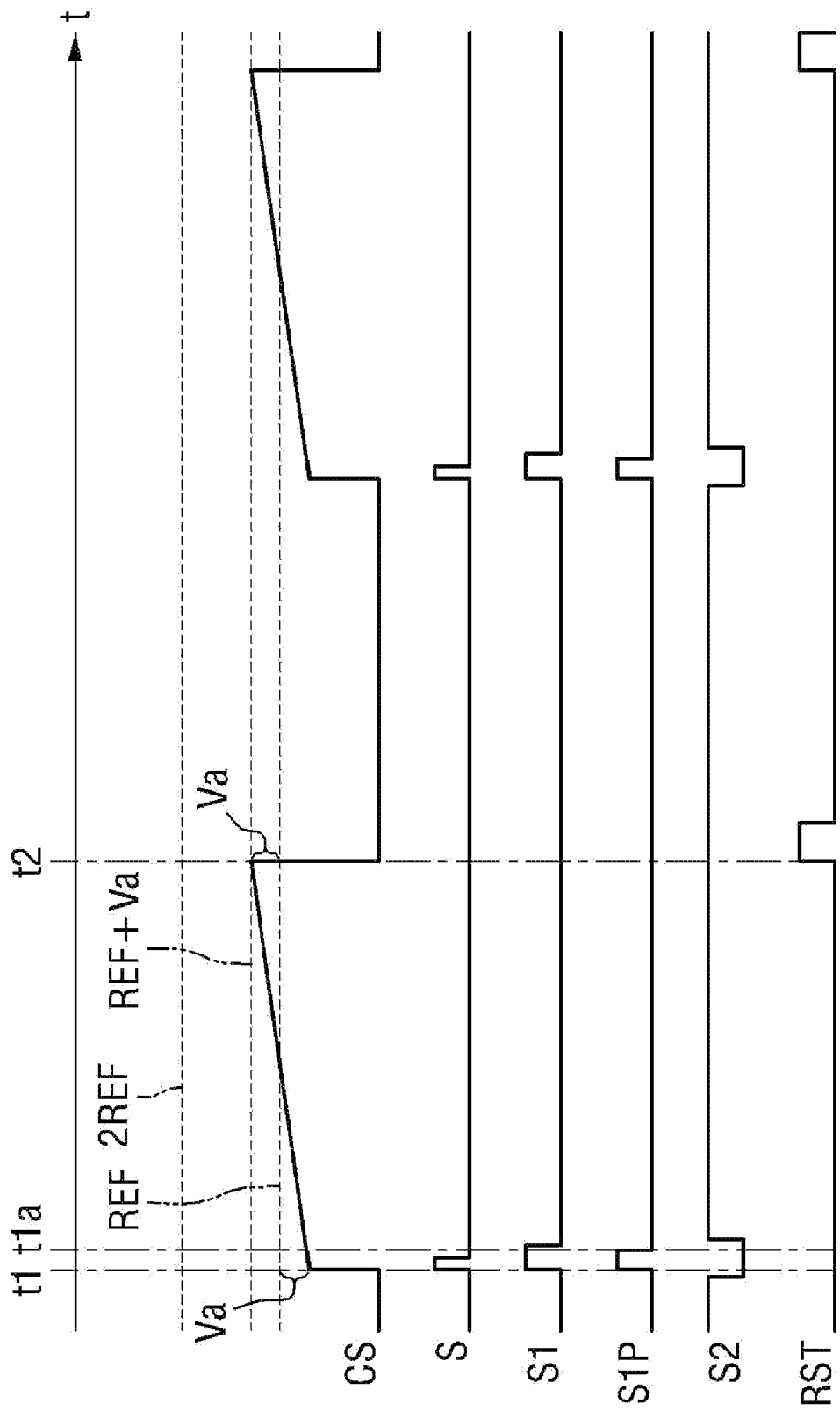
FIG. 16 is a timing diagram corresponding to a circuit diagram of FIG. 15.

FIG. 14 is a block diagram for explaining another embodiment of the reset signal generator of FIG. 2, and FIG. 15 is a circuit diagram for explaining an embodiment of the reset signal generator of FIG. 14. FIG. 16 is a timing diagram corresponding to the circuit diagram of FIG. 15.

Referring to FIG. 14 to FIG. 16, the reset signal generator includes a hold circuit 111 and a comparator 115.

The hold circuit 111 includes a first sampling capacitor Ca that samples a difference Va between the sampling voltage CSS and the reference voltage REF at the turn-on time point t1 of the switch 20 and samples the sum REF+Va of the difference Va and the reference voltage REF as the first voltage V1 from the time point t1a at which a predetermined time has passed, and a second sampling capacitor Cb that samples the monitoring voltage CS as the second voltage V2 from the time point t1a at which the predetermined time has passed.

The comparator 115 generates the reset signal RST when the levels of the first and second voltages sampled by the first and second capacitors Ca and Cb are equal to each other.

Referring to FIG. 15, the reset signal generator 110 may include the first and second capacitors Ca and Cb, first to sixth switches 151 to 156, and the comparator 115.

The first sampling capacitor Ca includes a first terminal (the left side in FIG. 14) and a second terminal (the right side in FIG. 14).

The first switch 151 is controlled by a signal S2 and is connected to the first terminal and the reference voltage REF.

The second switch 152 is controlled by a signal S1 and is connected to the first terminal and the monitoring voltage CS.

The third switch 153 is controlled by a signal SIP and is connected to the second terminal and the reference voltage REF.

The second sampling capacitor Cb includes a third terminal (the left side in FIG. 14) and a fourth terminal (the right side in FIG. 14).

The fourth switch 154 is controlled by the signal S1 and is connected to the third terminal and the monitoring voltage CS.

The fifth switch 155 is controlled by the signal S2 and is connected to the third terminal and the monitoring voltage CS.

The sixth switch 156 is controlled by the signal SIP and is connected to the fourth terminal and the monitoring voltage CS.

The second switch 152 and the fourth switch 154 are simultaneously turned on/off, the first switch 151 and the fifth switch 155 are simultaneously turned on/off, and the third switch 153 and the sixth switch 156 are simultaneously turned on/off. The first switch 151 and the second switch 152 are not simultaneously turned on.

The reference voltage REF and the monitoring voltage CS are selectively provided to the first terminal. When the reference voltage REF is applied to the first terminal, the monitoring voltage CS is applied to the third terminal, and when the monitoring voltage CS is applied to the first terminal, the monitoring voltage CS is applied to the third terminal.

The comparator 115 is connected to the second terminal of the first sampling capacitor Ca and the fourth terminal of the second sampling capacitor Cb.

The reset signal generator 110 illustrated in FIG. 15 is for illustrative purposes only, and the scope of the claims of the present invention is not limited thereto.

Referring to FIG. 15 and FIG. 16, at the time t1, the pulse type set signal S is generated. Furthermore, the signal S1 and the signal SIP are enabled, so that the second switch 152 to the fourth switch 154 and the sixth switch 156 are turned on. The signal S2 is disabled, so that the first switch 151 and the fifth switch 155 are turned off. Accordingly, charge of Ca (REF−CS) is charged in the first sampling capacitor Ca. No charge is charged in the second sampling capacitor Cb. This is because Cb (CS−CS)=0.

After the time t1a, the signal SIP and the signal S1 are sequentially disabled, so that the second switch 152 to the fourth switch 154 and the sixth switch 156 are turned off. After the signal S1 is disabled, the signal S2 is enabled, so that the first switch 151 and the fifth switch 155 are turned on.

When a voltage level in a node N1 is set as Vx, charge charged in the first sampling capacitor Ca is Ca(Vx−REF). However, since Ca(REF−CS)=Ca(Vx−REF), Vx=2REF−CS=REF+(REF−CS)=REF+Va.

When a voltage level in a node N2 is set as Vy, charge charged in the second sampling capacitor Cb is Cb(Vy−CS). However, since Cb(Vy−CS)=0, Vy=CS.

The monitoring voltage CS gradually increases from the start level to the peak level.

At the time t2, the monitoring voltage CS becomes equal to REF+Va. When Vx=Vy, that is, REF+Va=CS, the reset signal RST of the comparator 115 is enabled.

Figure 17:
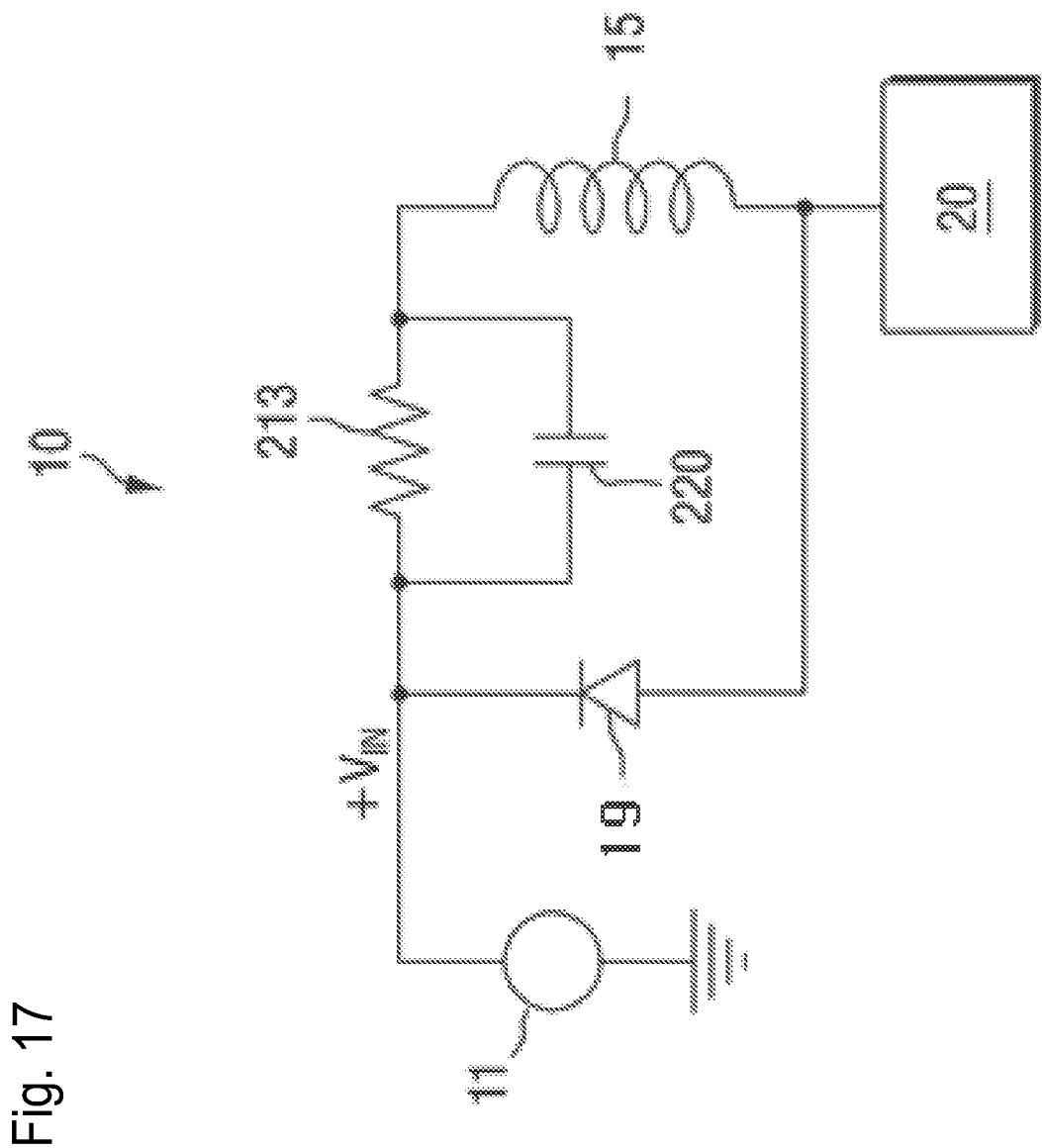
FIGS. 17 to 19 are circuit diagrams for explaining embodiments of an internal circuit of FIG. 1, respectively.
Figure 18:
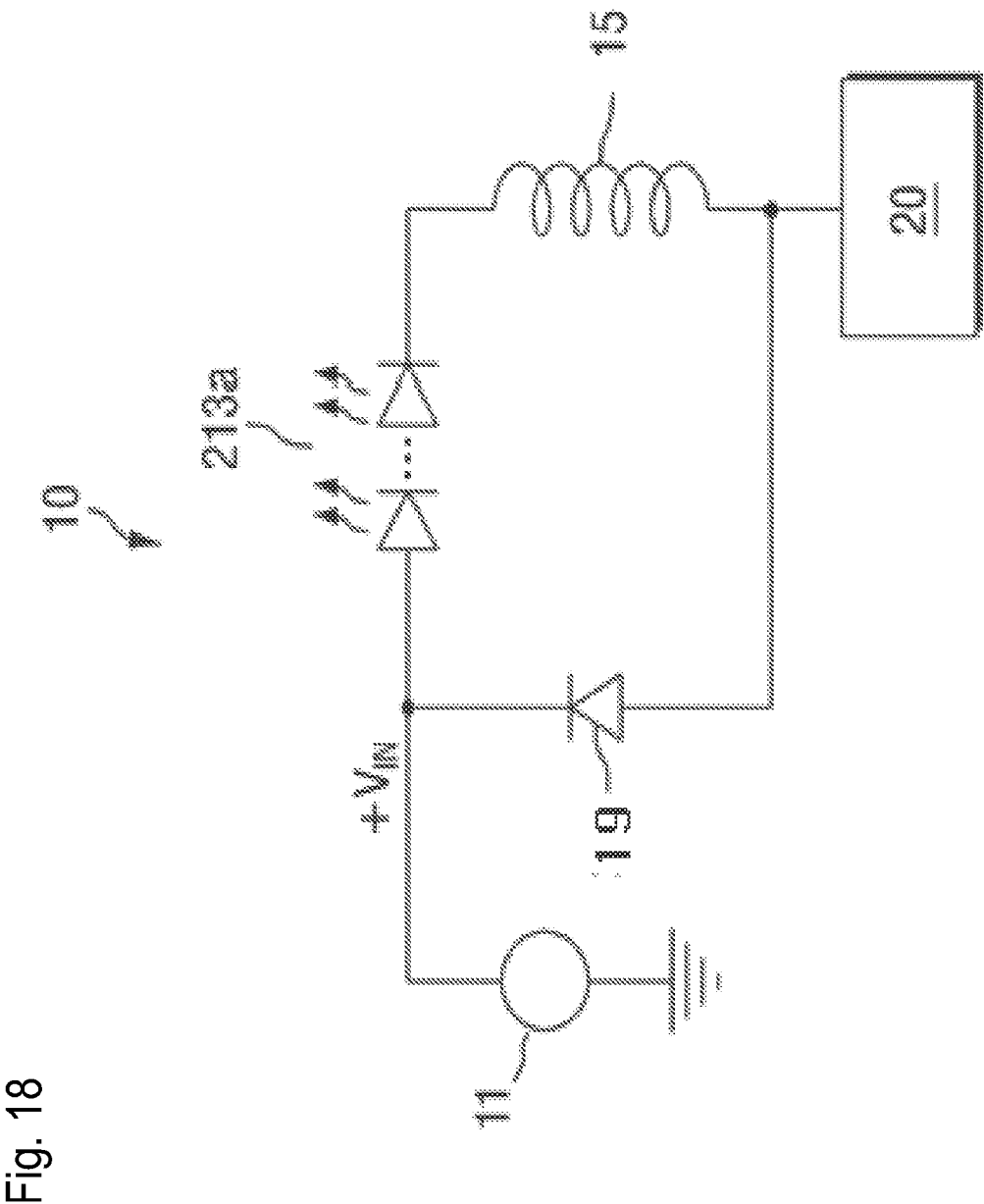
Figure 19:
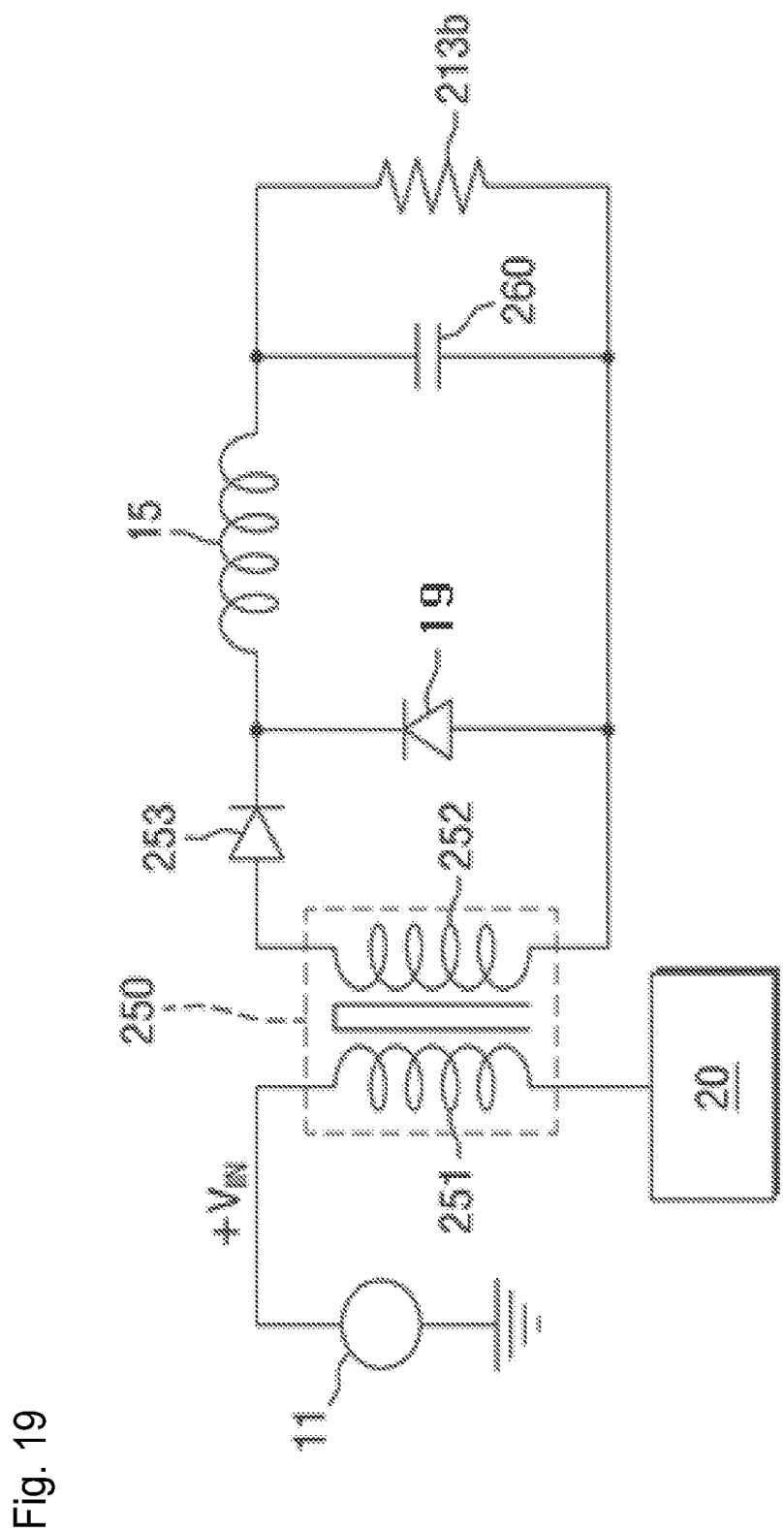

FIG. 17 to FIG. 19 illustrate examples of the internal circuit of FIG. 1, respectively. FIG. 17 illustrates a buck converter, FIG. 18 illustrates a light device, and FIG. 19 illustrates a power transformer. FIG. 17 to FIG. 19 are for illustrative purposes only, and the present invention is not limited thereto.

Referring to FIG. 17, the buck converter, for example, includes a resistor 213 and a capacitor 220, which is connected to both terminals of the resistor 213, as the output load (13, see FIG. 1). The inductive element 15 may be connected to the resistor 213 and one terminal of the capacitor 220, and the catch diode 19 may be connected to the other terminal thereof.

Referring to FIG. 18, the light device, for example, includes a plurality of LEDs 213a as the output load. The inductive element 15 may be connected to one terminal of each LED 213a, and the catch diode 19 may be connected to the other terminal thereof.

Referring to FIG. 19, the power transformer 250, for example, includes a primary winding 251 and a secondary winding 252. The input power source 11 is connected to the primary winding 251. A control diode 253 is connected to the secondary winding 252. The control diode 253 and the catch diode 19 may be connected to one terminal of the inductive element 15, and a resistor 213b and an output filter capacitor 260 may be connected to the other terminal thereof. One terminal of the catch diode 19 may be connected to a node between the inductive element 15 and the control diode 253, and the other terminal thereof may be connected to a node between the resistor 213b and the secondary winding 252.

Although various embodiments have been described for illustrative purposes, it will be apparent to those skilled in the art that various changes and modifications may be made without departing from the spirit and scope of the invention as defined in the following claims.

What is claimed is:

1. A switching apparatus including an internal circuit using an inductive element, comprising:
   a switch that regulates a current of the inductive element; and
   a signal control circuit that arithmetically calculates a turn-off time point of the switch by using a monitoring voltage corresponding to the current of the inductive element, a sampling voltage of the monitoring voltage, and a reference voltage corresponding to a target average current of the inductive element, and controls the switch,
   wherein the signal control circuit samples a difference between die monitoring voltage and the reference voltage at a turn-on time point of the switch, samples a sum of the difference and the reference voltage as a first voltage at a time point which a predetermined time has passed based on the turn-on time point of the switch, samples the monitoring voltage as a second voltage from the time point at which the predetermined time has passed, and turns off the switch when the second voltage reaches the level of the first voltage.

2. The switching apparatus of claim 1, wherein the signal control circuit arithmetically calculates a time point, at which an average current flowing through the inductive element has reached the target average current for a turn-on time of the switch, as the turn-off time point of the switch.

3. The switching apparatus of claim 1, wherein the signal control circuit comprises:
   an SR latch that turns on the switch in correspondence to a set signal periodically provided and turns off the switch in correspondence to a reset signal; and
   a reset signal generator that obtains a first voltage and a second voltage by using at least one of the monitoring voltage, the sampling voltage sampled the monitoring voltage at a turn-on time point of the switch, and the reference voltage, generates the reset signal at the time point at which the average current flowing through the inductive element has reached the target average current by using correlation of the first voltage and the second voltage, and provides the reset signal to the SR latch.

4. The switching apparatus of claim 3, wherein the reset signal generator comprises:
   a first sampling capacitor that samples the difference between the monitoring voltage and the reference voltage at the turn-on time point of the switch, and samples the sum of the difference and the reference voltage as the first voltage at the time point which the predetermined time has passed based on the turn-on time point of the switch;
   a second sampling capacitor that samples the monitoring voltage as the second voltage from the time point at which the predetermined time has passed; and
   a comparator that generates the reset signal to turn off the switch when the second voltage reaches the level of the first voltage.

5. The switching apparatus of claim 3, wherein an output terminal of the SR latch is connected to a terminal of the switch to turn on and off the switch.

6. The switching apparatus of claim 1, wherein the internal circuit includes any one of a buck converter, a light device, and a transformer.

7. A switching apparatus including an internal circuit using an inductive element, comprising:
   a switch that regulates a current of the inductive element;
   an SR latch that turns on the switch in correspondence to a set signal periodically provided and turns off the switch in correspondence to a reset signal; and
   a reset signal generator that receives a monitoring voltage corresponding to the current of the inductive element and a reference voltage corresponding to a target average current of the inductive element, obtains a first voltage and a second voltage sampled using at least one of the monitoring voltage and the reference voltage, and generates the reset signal when levels of the first and second voltages are equal to each other,
   wherein the reset signal generator samples a difference between the monitoring voltage and the reference voltage at a turn-on time point of the switch, samples a sum of the difference and the reference voltage as the first voltage at a time point which a predetermined time has passed based on the turn-on time point of the switch, samples the monitoring voltage as the second voltage from the time point at which the predetermined time has passed, and generates the reset signal to turn off the switch when the second voltage reaches the level of the first voltage.

8. The switching apparatus of claim 7, wherein the reset signal generator comprises:
   a first sampling capacitor that samples the difference between the monitoring voltage and the reference voltage at the turn-on time point of the switch, and samples the sum of the difference and the reference voltage as the first voltage at the time point which the predetermined time has passed based on the turn-on time point of the switch;
   a second sampling capacitor that samples the monitoring voltage as the second voltage from the time point at which the predetermined time has passed; and
   a comparator that generates the reset signal to turn off the switch when the second voltage reaches the level of the first voltage.

9. The switching apparatus of claim 8, wherein the reset signal generator further comprises:
   a first switch that transfers the monitoring voltage to one side of the first sampling capacitor at the turn-on time point of the switch;
   a second switch that transfers the reference voltage to a remaining side of the first sampling capacitor at the turn-on time point of the switch;

a third switch that transfers the reference voltage to the one side of the first sampling capacitor from the time point at which the predetermined has passed;

a fourth switch that transfers the monitoring voltage to one side of the second sampling capacitor at the turn-on time point of the switch;

a fifth switch that transfers the monitoring voltage to a remaining side of the second sampling capacitor at the turn-on time point of the switch; and a sixth switch that transfers the monitoring voltage to the one side of the second sampling capacitor from the time point at which the predetermined has passed, wherein the remaining sides of the first and second sampling capacitors are connected to an input terminal of the comparator.

10. The switching apparatus of claim 7, wherein an output terminal of the SR latch is connected to a terminal of the switch to turn on and off the switch.

11. A control method of a switching apparatus including an internal circuit using an inductive element and a switch for regulating a current of the inductive element, comprising the steps of:

turning on the switch in correspondence to a set signal periodically provided;

receiving a monitoring voltage corresponding to the current flowing through the inductive element when the switch is turned on, and receiving a reference voltage corresponding to a target average current of the inductive element;

sampling a difference between the monitoring voltage and the reference voltage at a turn-on time point of the switch;

sampling a sum of the difference and the reference voltage as a first voltage at a time point which a predetermined time has passed based on the turn-on time point of the switch;

sampling the monitoring voltage as a second voltage from the time point at which the predetermined time has passed turning off the switch, when the second voltage reaches the level of the first voltage.

* * * * *